United States Patent
Ozawa

(10) Patent No.: US 9,684,390 B2
(45) Date of Patent: Jun. 20, 2017

(54) IMAGE DISPLAY DEVICE, PROJECTOR, AND CONTROL METHOD FOR IMAGE DISPLAY DEVICE

(71) Applicant: Seiko Epson Corporation, Tokyo (JP)

(72) Inventor: Takashi Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 89 days.

(21) Appl. No.: 14/561,135

(22) Filed: Dec. 4, 2014

(65) Prior Publication Data

US 2015/0160742 A1    Jun. 11, 2015

(30) Foreign Application Priority Data

Dec. 10, 2013    (JP) .................................. 2013-254769

(51) Int. Cl.
| | |
|---|---|
| *G06F 3/0354* | (2013.01) |
| *G06F 3/03* | (2006.01) |
| *G06F 3/038* | (2013.01) |
| *G06F 3/0481* | (2013.01) |

(52) U.S. Cl.
CPC ........ *G06F 3/03545* (2013.01); *G06F 3/0304* (2013.01); *G06F 3/0386* (2013.01); *G06F 3/0481* (2013.01)

(58) Field of Classification Search
CPC ............... G06F 3/03545; G06F 3/0481; G06F 3/04883; G06F 3/0304; G06F 3/0386; G06F 3/011; G06F 3/002
USPC ......................................................... 345/179
See application file for complete search history.

(56) References Cited

U.S. PATENT DOCUMENTS

| | | | |
|---|---|---|---|
| 6,862,712 B1* | 3/2005 | Nakagawa | G06F 3/0481 715/707 |
| 2007/0253600 A1* | 11/2007 | Furukawa | G06F 3/002 382/112 |
| 2008/0170752 A1* | 7/2008 | Murayama | A63F 13/10 382/103 |
| 2011/0164192 A1 | 7/2011 | Ozawa | |
| 2011/0185300 A1* | 7/2011 | Hinckley | G06F 3/03545 715/769 |
| 2012/0135803 A1* | 5/2012 | Nonaka | G06F 3/011 463/31 |
| 2013/0120434 A1* | 5/2013 | Kim | G06F 3/04883 345/594 |

FOREIGN PATENT DOCUMENTS

| | | |
|---|---|---|
| JP | 2000-259306 A | 9/2000 |
| JP | 2002-373312 A | 12/2002 |
| JP | 2008-225555 A | 9/2008 |
| JP | 2010-79834 A | 4/2010 |
| JP | 2010-284797 A | 12/2010 |
| JP | 2011-140154 A | 7/2011 |
| JP | 2011-141411 A | 7/2011 |
| JP | 2011-242900 A | 12/2011 |

\* cited by examiner

*Primary Examiner* — Fred Tzeng
(74) *Attorney, Agent, or Firm* — ALG Intellectual Property, LLC

(57) ABSTRACT

As a start operation for an auxiliary line mode is accepted, the projector displays an auxiliary line. When an auxiliary line mode end operation is accepted or a non-drawing state exceeds a certain time, the projector erases the auxiliary line and ends the auxiliary line mode.

9 Claims, 5 Drawing Sheets

IMAGE DISPLAY DEVICE, PROJECTOR, AND CONTROL METHOD FOR IMAGE DISPLAY DEVICE

The entire disclosure of Japanese Patent Application No. 2013-254769, filed Dec. 10, 2013 is expressly incorporated by reference herein.

BACKGROUND

1. Technical Field

The present invention relates to an image display device which displays an image, a projector, and a control method for an image display device.

2. Related Art

According to the related art, an image display device such as a projector which displays, on a screen or the like, an image based on an image signal outputted from a computer or the like is known.

JP-A-2011-140154 proposes an interactive whiteboard system (interactive system) in which a display device (projector) detects an operation carried out on a displayed (projected) image by the user using an electronic pen and generates and displays an image based on information about the operation by the user. In such an interactive system, when the user draws handwritten characters on an image with the electronic pen, the positions of the characters may be misaligned and the writing may go out of line. Meanwhile, JP-A-2011-242900 proposes a handwritten character input device which discriminates handwritten characters, determines the input direction thereof, and generates a guide line.

However, in the handwritten character input device of JP-A-2011-242900, a reference character component needs to be determined from a drawn image and therefore there can be an error in detecting a character or input direction, depending on the shape of the character. Also, the guide line is displayed up to the ends of the display section and therefore can obstruct other drawn images.

Thus, an image display device which enables easy drawing of characters or the like on a screen, using an indicator (electronic pen or the like), is demanded.

SUMMARY

An advantage of some aspects of the invention is to solve at least a part of the problems described above, and the invention can be implemented as the following forms or application examples.

APPLICATION EXAMPLE 1

This application example is directed to an image display device having a display unit for displaying an image, the image display device comprising: a position detection unit that detects position information representing a position indicated by an indicator within image data corresponding to an image displayed by the display unit; a drawing unit that generates drawing data according to the position information when a drawing by the indicator is carried out, the drawing unit projecting the drawing data; an auxiliary line display unit that displays an auxiliary line within the image data; a mode setting unit that sets an auxiliary line mode in which the auxiliary line is displayed at a time of the drawing and in which the auxiliary line is erased at an end of the drawing; and a control unit that causes the auxiliary line display unit to display the auxiliary line at the time of the drawing in the auxiliary line mode.

According to this application example, in the auxiliary line mode, an auxiliary line is displayed on a displayed image at the time of drawing, and the auxiliary line is erased at the end of the drawing. This makes it easier to draw characters and symbols or the like with reference to the auxiliary line. Also, the auxiliary line is erased at the end of the drawing. Therefore, the auxiliary line can be prevented from obstructing drawing data and image data.

APPLICATION EXAMPLE 2

In the image display device according to the application example described above, it is preferable that the mode setting unit starts the auxiliary line mode when the position detection unit detects an indication by the indicator to a predetermined area within the image data.

According to this application example, the auxiliary line mode, in which an auxiliary line is displayed at the time of drawing, is started by an operation of the indicator. Therefore, an auxiliary line can be displayed at a desired time while image data is projected, thus enabling efficient drawing.

APPLICATION EXAMPLE 3

In the image display device according to the application example described above, it is preferable that the control unit causes the auxiliary line with a predetermined length to be displayed at the position of the indicator before the drawing by the indicator is started and moves the auxiliary line with a movement of the indicator, after the auxiliary line mode is started.

According to this application example, when drawing in the auxiliary line mode is started, an auxiliary line with a predetermined length is displayed at the position of the indicator and the auxiliary line moves with the movement of the indicator. Therefore, the position to display an auxiliary line can be designated freely.

APPLICATION EXAMPLE 4

In the image display device according to the application example described above, it is preferable that the mode setting unit ends the auxiliary line mode when the position detection unit detects an indication by the indicator to a predetermined area within the image data or when drawing by the indicator is not carried out for a predetermined period, after the drawing is started.

According to this application example, the auxiliary line mode is ended when an indication is given by the indicator or when drawing is not carried out for a predetermined period, at the time of drawing in the auxiliary line mode. Thus, when an auxiliary line is no longer necessary during drawing in which the auxiliary line is displayed, the auxiliary line is immediately erased in response to an indication by the indicator. When drawing is not carried out for a while, the auxiliary line is automatically erased. The auxiliary line mode can be thus ended.

APPLICATION EXAMPLE 5

In the image display device according to the application example described above, it is preferable that the control unit adds the auxiliary line in a parallel direction or extends the length of the auxiliary line according to the position of the drawing data that is drawn, after the drawing is started.

According to this application example, during drawing in the auxiliary line mode, an auxiliary line is extended or added according to drawing data. Therefore, in the case where the drawing range of characters and symbols expands or where drawing is started on a different line, an auxiliary line can be extended or added without any particular operation.

APPLICATION EXAMPLE 6

This application example is directed to a projector having a light source and an image projection unit which modulates a light emitted from the light source according to image data and projects the modulated light, the projector comprising: a position detection unit that detects position information representing a position indicated by an indicator within a projected image projected by the image projection unit; a drawing unit that generates drawing data in the projected image according to the position information when a drawing by the indicator is carried out, the drawing unit projecting the drawing data; an auxiliary line display unit that displays an auxiliary line within the projected image; a mode setting unit that sets an auxiliary line mode in which the auxiliary line is displayed at a time of the drawing and in which the auxiliary line is erased at an end of the drawing; and a control unit that causes the auxiliary line display unit to display the auxiliary line at the time of the drawing in the auxiliary line mode.

According to this application example, in the auxiliary line mode, an auxiliary line is displayed on a projected image projected by the projector at the time of drawing, and the auxiliary line is erased at the end of the drawing. This makes it easier to draw characters and symbols or the like with reference to the auxiliary line. Also, the auxiliary line is erased at the end of the drawing. Therefore, the auxiliary line can be prevented from obstructing drawing data and projected image data.

APPLICATION EXAMPLE 7

This application example is directed to a control method for an image display device having a display unit for displaying an image, the method comprising: detecting position information representing a position indicated by an indicator within image data corresponding to an image displayed by the display unit; generating drawing data within the image data according to the position information when a drawing by the indicator is carried out and projecting the drawing data; displaying an auxiliary line within the image data; setting an auxiliary line mode in which the auxiliary line is displayed at a time of the drawing and in which the auxiliary line is erased at an end of the drawing; and causing the auxiliary line to be displayed, by the displaying of the auxiliary line, at the time of the drawing in the auxiliary line mode.

According to this application example, in the auxiliary line mode, an auxiliary line is displayed on a displayed image at the time of drawing, and the auxiliary line is erased at the end of the drawing. This makes it easier to draw characters and symbols or the like with reference to the auxiliary line. Also, the auxiliary line is erased at the end of the drawing. Therefore, the auxiliary line can be prevented from obstructing drawing data and image data.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment of the invention will be described with reference to the drawings.

It should be noted that the following embodiment is not to limit the invention according to the appended claims and that not all the combinations of features in the embodiment are essential to the solution of the invention.

Embodiment

Figure 1:
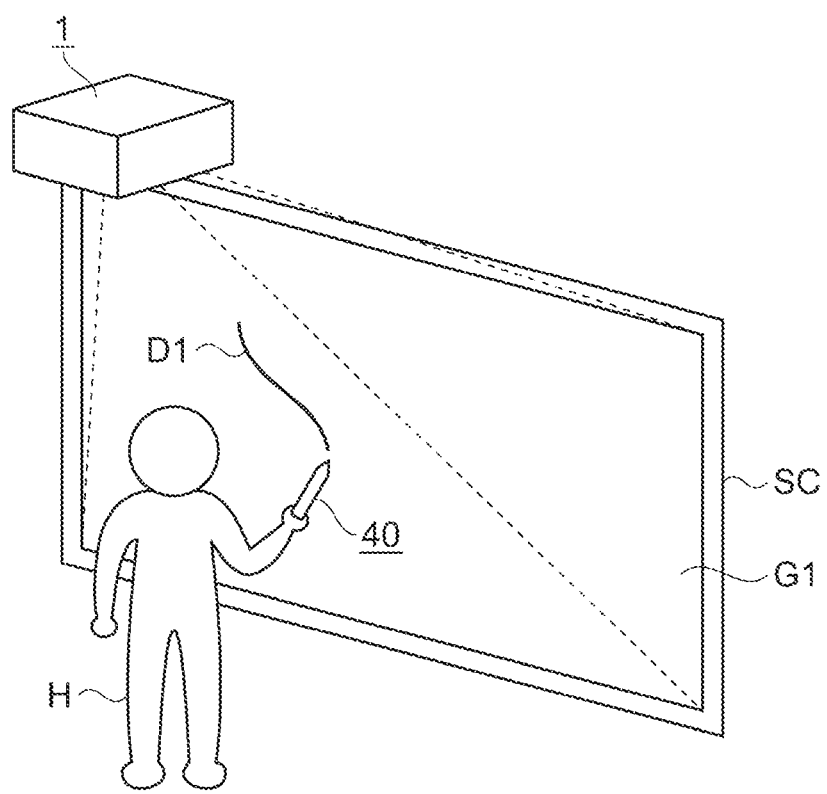
FIG. 1 is an explanatory view showing the form of use of a projector according to an embodiment.

FIG. 1 is an explanatory view showing the form of use of a projector 1 according to this embodiment.

As shown in FIG. 1, the projector 1 is suspended above the head of a user H. The user H carries out a drawing operation using an electronic pen 40 on a projection surface SC where the projector 1 projects an image. The projector 1 causes a pen operation detection unit 25 (see FIG. 3), described later, to detect operation information such as position information indicated by the electronic pen 40. The projector 1 then combines drawing data D1 based on the drawing operation of the electronic pen 40 with image data G1 and thus projects the combined data as an image on the projection surface SC.

In the description below, the expression "project (display) data as an image on the projection surface" is abbreviated as "project (display) data" or the like.

Figure 2:
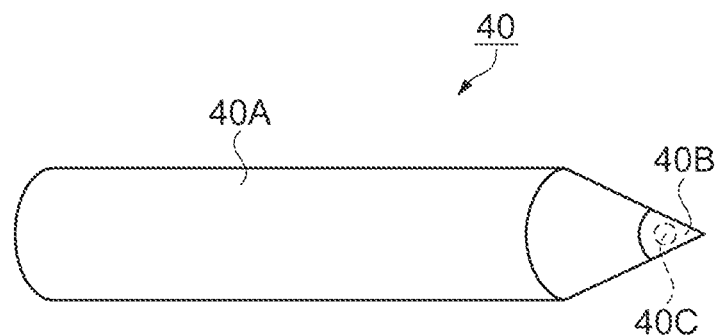
FIG. 2 shows the appearance of an electronic pen.

FIG. 2 shows the appearance of the electronic pen 40.

As shown in FIG. 2, the electronic pen 40 has a pen-shaped casing 40A with a pointed tip. At the tip of the casing 40A, a pen point switch 40B and a light emitting portion 40C which emits infrared rays are provided. The pen operation detection unit 25 of the projector 1, described later, picks up an image of the infrared rays and detects the operation position of the electronic pen 40. In this embodiment, the electronic pen 40 is equivalent to an indicator.

Figure 3:
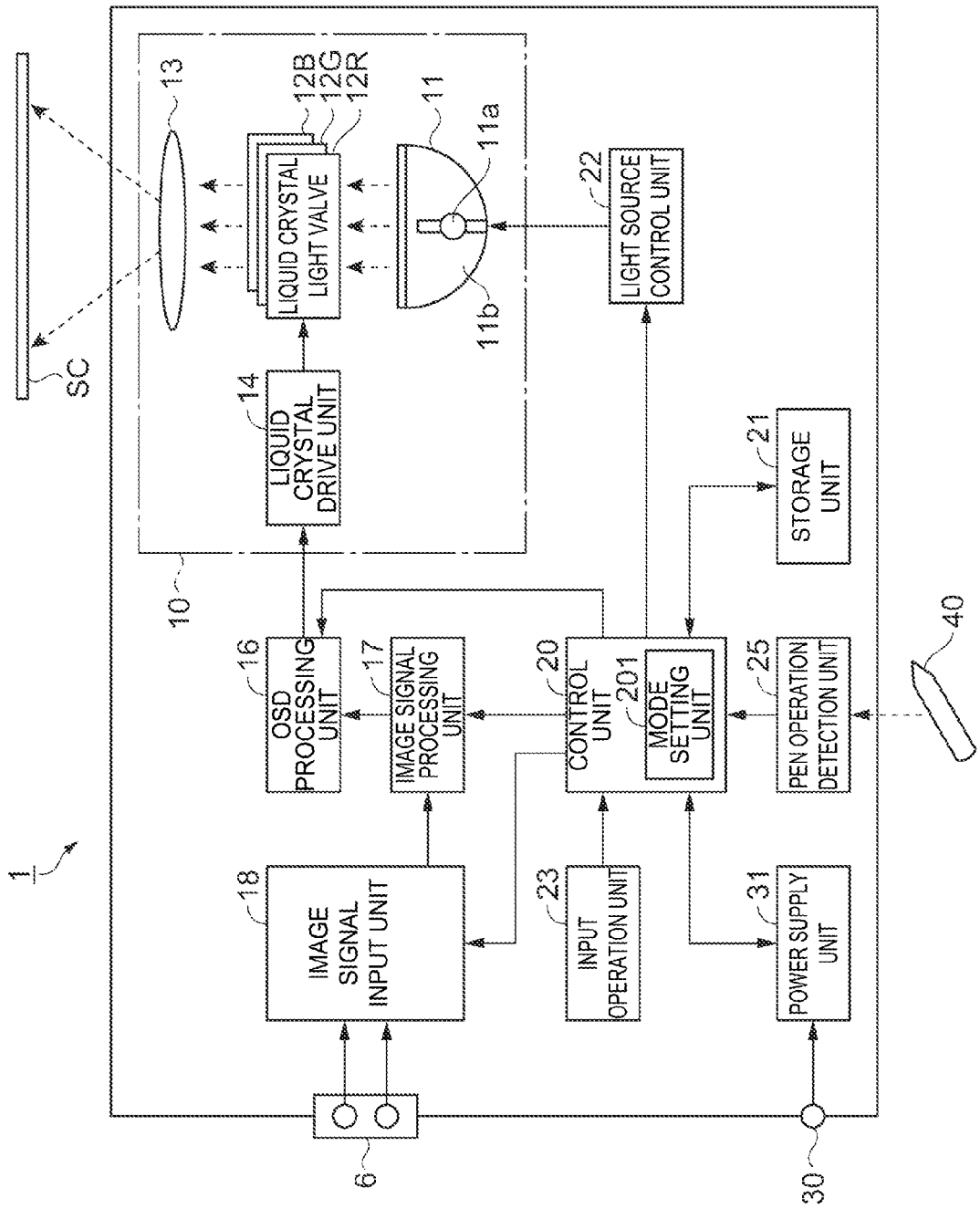
FIG. 3 is a block diagram showing the circuit configuration of the projector.

FIG. 3 is a block diagram showing the circuit configuration of the projector 1 of this embodiment.

As shown in FIG. 3, the projector 1 includes an image input terminal 6, an image projection unit 10 as a display unit, an OSD processing unit 16, an image signal processing unit 17, an image signal input unit 18, a control unit 20, a storage unit 21, a light source control unit 22, an input operation unit 23, a pen operation detection unit 25, a power supply terminal 30, a power supply unit 31 and the like. These units are accommodated inside or on the outer surface of the casing of the projector 1, not shown.

The image projection unit 10 includes a light source 11, three liquid crystal light valves 12R, 12G, 12B as a light modulation device, a projection lens 13 as a projection system, a liquid crystal drive unit 14 and the like. In the image projection unit 10, the light emitted from the light source 11 is modulated by the liquid crystal light valves 12R, 12G, 12B and then projected from the projection lens 13, thus displaying an image on the projection surface SC or the like.

The light source 11 includes a discharge-type light source lamp 11a made up of an ultrahigh-pressure mercury lamp, metal halide lamp or the like, and a reflector 11b which reflects the light radiated by the light source lamp 11a toward the liquid crystal light valves 12R, 12G, 12B.

The light emitted from the light source 11 is converted to a light with substantially uniform luminance distribution by an optical integration system, not shown. The light is separated into each color light component of red (R), green (G), and blue (B), which are the three primary colors of light, by a color separation system, not shown, and subsequently the separate light components become incident on the respective liquid crystal light valves 12R, 12G, 12B.

Each of the liquid crystal light valves 12R, 12G, 12B is formed by a liquid crystal panel having liquid crystal enclosed between a pair of transparent substrates, or the like. A plurality of pixels (not shown) arrayed in a matrix is formed in each of the liquid crystal light valves 12R, 12G, 12B, and a drive voltage can be applied to the liquid crystal on a pixel basis.

As the liquid crystal drive unit 14 applies a drive voltage corresponding to inputted image information to each pixel, each pixel is set to a light transmittance corresponding to the image information. Therefore, the light emitted from the light source 11 is modulated as the light passes through the liquid crystal light valves 12R, 12G, 12B. Thus, an image light corresponding to the image information is formed for each color light.

The resulting image lights of the respective colors are combined on a pixel basis by a color combining system, not shown, thus forming a color image light, which is subsequently enlarged and projected on the projection surface SC or the like by the projection lens 13.

In this embodiment, the projector 1 which performs projection using the light source lamp 11a of the light source 11 is described as an example. However, the invention can also be applied to a projector which performs projection using an LED (light emitting diode) light source or a laser light source or the like.

In the embodiment, as an example, the image projection unit 10 is described as employing a transmission-type liquid crystal projection system using the three liquid crystal light valves 12R, 12G, 12B. However, a light modulation device using other display methods, such as a reflection-type liquid crystal display method or a micromirror device method (light switch display method), may also be employed.

Image information is inputted to the image signal input unit 18 by the plurality of image input terminals 6 from an external image output device such as a video reproduction device or personal computer, via a cable or communication device or the like, not shown. The inputted image information is outputted to the image signal processing unit 17 on the basis of an instruction from the control unit 20. The image signal input unit 18 may also be configured to include a receiving unit for wireless communication, optical communication or the like, so as to input an image signal wirelessly from an external device.

The image signal processing unit 17 converts the image information inputted from the image signal input unit 18 to image information expressing the gradation level of each pixel in the liquid crystal light valves 12R, 12G, 12B, on the basis of an instruction from the control unit 20. Here, the converted image information is for each of the color lights of red (R), green (G), and blue (B), and formed by a plurality of pixel values corresponding to all the pixels in each of the liquid crystal light valves 12R, 12G, 12B. A pixel value defines the light transmittance of the corresponding pixel. This pixel value prescribes the intensity (gradation level) of the light transmitted through and emitted from each pixel.

The OSD processing unit 16 carries out processing to superimpose and display an OSD (on-screen display) image such as a menu image or message image on the projected image, on the basis of an instruction from the control unit 20. The OSD processing unit 16 has an OSD memory, not shown, which stores OSD image information representing a graphic pattern, font and the like for forming an OSD image.

As the control unit 20 gives an instruction to superimpose and display an OSD image, the OSD processing unit 16 reads out necessary OSD image information from the OSD memory and combines this OSD image information with the image information inputted from the image signal processing unit 17 in such a way that the OSD image is superimposed at a predetermined position on the projected image. The image information combined with the OSD image information is outputted to the liquid crystal drive unit 14.

If no instruction to superimpose an OSD image is given from the control unit 20, the OSD processing unit 16 outputs the image information inputted from the image signal processing unit 17, directly to the liquid crystal drive unit 14.

As the liquid crystal drive unit 14 drives the liquid crystal light valves 12R, 12G, 12B according to the image information inputted from the OSD processing unit 16, the liquid crystal light valves 12R, 12G, 12B form an image corresponding to the image information. This image is projected from the projection lens 13.

The control unit 20 has a CPU (central processing unit), a RAM (random access memory) used to temporarily store various data and the like, and operates according to a control program (not shown) stored in the storage unit 21, thus performing general control over the operation of the projector 1. That is, the control unit 20, with the storage unit 21, functions as a computer.

The control unit 20 saves image data based on the position information of the electronic pen 40 detected by the pen operation detection unit 25, into the storage unit 21. The control unit 20 is equivalent to a drawing unit which causes the image projection unit 10 to superimpose and project drawing data on image data. The control unit 20 is also equivalent to an auxiliary line display unit which causes the image projection unit 10 to project an auxiliary line. The control unit 20 also includes a mode setting unit 201 which sets an auxiliary line mode in which an auxiliary line is projected at the time of drawing with the electronic pen 40.

The storage unit 21 is made up of a rewritable non-volatile memory such as a flash memory or FeRAM and stores a control program for controlling the operation of the projector 1, various setting data for prescribing operation conditions or the like of the projector 1, and the like. Drawing data by the electronic pen 40, auxiliary line data and the like are stored in the storage unit 21.

The light source control unit 22 controls the supply and stop of power to the light source 11 and thus switches between the turning on and off of the light source 11, on the basis of an instruction from the control unit 20.

The input operation unit 23 has a plurality of operation keys for the user H to give various instructions to the projector 1, though not shown. The operation keys are formed as main body keys provided on the outer surface of the casing (not shown) of the projector 1.

The operation keys provided in the input operation unit 23 may be a power supply key for alternately switching between on and off of the power supply, an input switching key for switching between the plurality of image input terminals 6, a menu key for superimposing and displaying a setting menu or the like, direction keys (four operation keys corresponding to up, down, left and right) used to select an item on the setting menu or the like, a decision key for finalizing a selected item, a cancellation key for cancelling an operation, and the like.

As the user H operates various operation keys in the input operation unit 23, the input operation unit 23 outputs an operation signal corresponding to the content of the operation by the user H, to the control unit 20. The input operation unit 23 may be configured to have a remote controller (not shown) capable of remote operation with a remote controller (remote) signal receiving unit (not shown). In such a case, the remote controller sends an operation signal of infrared rays or the like corresponding to the content of the operation by the user H, and the remote signal receiving unit receives this signal and transmits the signal to the control unit 20 as control information.

The pen operation detection unit 25 is equivalent to a position detection unit and configured with an image pickup element or the like, not shown. The pen operation detection unit 25 detects the operation position (coordinates) of the electronic pen 40 and the pen operation state such as the pressing state of the pen point switch 40B (see FIG. 2), on the basis of an instruction from the control unit 20, and notifies the control unit 20 of the detected pen operation information.

The power supply unit 31 is supplied with power of AC 100 V or the like from outside via the power supply terminal 30. The power supply unit 31 converts, for example, grid power (AC power) to DC power with a predetermined voltage, and supplies the converted power to each part of the projector 1. Also, the power supply unit 31 can switch between a state where necessary power (operation power) for projection of an image is supplied to each part (power-on state) and a state where the supply of the operation power is stopped and an operation to turn the power on is waited for (standby state), on the basis of an instruction from the control unit 20.

Next, an example of transition of a projected image in the auxiliary line mode in the case where drawing is carried out using the electronic pen 40, in the projector 1 according to the embodiment, will be described with reference to the of screen transition views of FIGS. 4A to 4F.

Figure 4A:
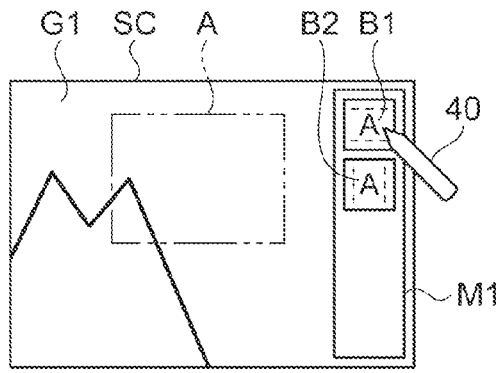
FIGS. 4A to 4F show screen transition at the time when characters are drawn and auxiliary lines are displayed.
Figure 4B:
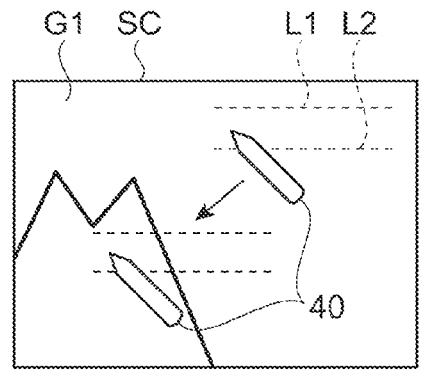

FIGS. 4A to 4F show screen transition at the time when characters are drawn and auxiliary lines are displayed. FIG. 4A shows the whole projection surface SC in the state where image data G1 and a tool menu M1 are projected. FIG. 4B shows the whole projection surface SC and the movement of auxiliary lines L1, L2 accompanying the movement of the electronic pen 40. FIG. 4B also shows a drawing start state.

Figure 4C:
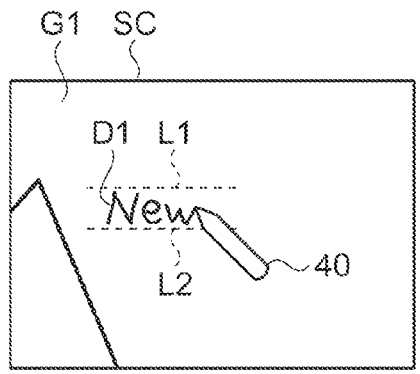
Figure 4D:
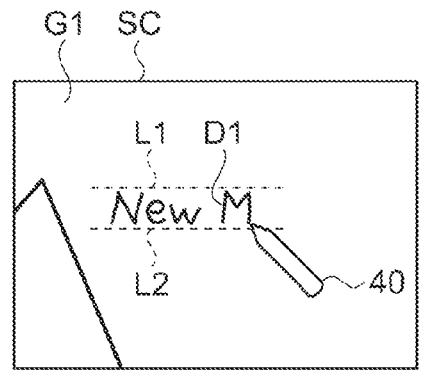
Figure 4E:
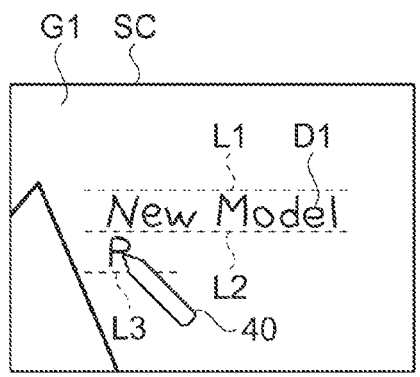
Figure 4F:
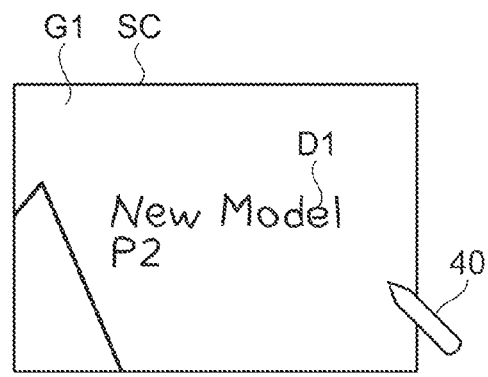

FIGS. 4C to 4F are enlarged views of an area A that is a part of the image data G1 shown in FIG. 4A. FIGS. 4C to 4E show a drawing state. FIG. 4F shows a drawing end state.

As shown in FIG. 4A, on the projection surface SC, as an example, the image data G1 is projected as an image and the tool menu M1 for creating a drawing image is projected as well.

The tool menu M1 is an aggregate of various operation menus used at the time of drawing with the electronic pen 40. The user H presses a button corresponding to a desired operation in this tool menu M1, using the electronic pen 40, and thus carries out drawing.

In this embodiment, an auxiliary line mode button B1 in the tool menu M1 is a button to project an auxiliary line in a horizontal direction. An auxiliary line mode button B2 is a button to project an auxiliary line in a vertical direction. In this embodiment, when the auxiliary line mode button B1 (B2) is pressed, the start and end of the auxiliary line mode is repeated every time the button is pressed.

The area of the auxiliary line mode button B1 (B2) in the projected tool menu M1 is equivalent to a predetermined area within the image data G1.

As the auxiliary line mode button B1 in the tool menu M1 is pressed with the electronic pen 40, as shown in FIG. 4A, the auxiliary line mode starts, and the screen shifts to the drawing start state to start drawing, as shown in FIG. 4B.

When the screen shifts to the drawing start state, as shown in FIG. 4B, the two auxiliary lines L1, L2 with a predetermined length are projected at a position indicated by the electronic pen 40 on the projection surface SC. Then, as the electronic pen 40 is moved, the auxiliary lines L1, L2 move with the position of the electronic pen 40. Here, as the electronic pen 40 is pressed against the projection surface SC and the pen point switch 40B is operated, the screen shifts to the drawing state to carry out drawing, as shown in FIG. 4C.

When the screen shifts to the drawing state, as shown in FIG. 4C, the position of the auxiliary lines L1, L2 is fixed. Then, as a drawing operation is carried out with the electronic pen 40, drawing data D1 is sequentially generated and drawn, superimposed on the image data G1. In FIG. 4C, the characters "New" are drawn. If the drawing is continued in this state and the drawing data D1 exceeds the range of the auxiliary lines L1, L2, the screen shifts to the state shown in FIG. 4D.

Specifically, as shown in FIG. 4D, the auxiliary lines L1, L2 are extended to the right, corresponding to the position of the character "M" drawn with the electronic pen 40 from the state of FIG. 4C. If the drawing is continued further to the right, the auxiliary lines L1, L2 are extended further. Here, if drawing is carried out on the line below the current drawing position, the screen shifts to the state shown in FIG. 4E.

As shown in FIG. 4E, as the drawing is continued onto a different line, a new auxiliary line L3 is added and projected below the auxiliary line L2 and parallel to the auxiliary lines L1, L2, corresponding to the new drawing position. In FIG. 4E, the auxiliary line L3 is added below the auxiliary line L2. However, if a different line is taken above, an auxiliary line is added above the auxiliary line L1 and parallel to the auxiliary lines L1, L2.

Here, if the auxiliary line mode button B1 shown in FIG. 4A is pressed again or a predetermined time passes without drawing, the screen shifts to the drawing end state to end the drawing, as shown in FIG. 4F.

When the screen shifts to the drawing end state, as shown in FIG. 4F, the auxiliary lines L1, L2, L3 are erased and the auxiliary line mode ends. On the projection surface SC, the drawing data D1 is projected, superimposed on the image data G1.

While FIGS. 4A to 4F show the example in which the auxiliary lines L1, L2, L3 are projected in horizontal directions, a similar operation is carried out also in the case of projecting auxiliary lines in vertical directions. In such a case, according to this embodiment, the auxiliary line mode button B2 in the tool menu M1 shown in FIG. 4A is pressed, as described above.

Next, the operation of the projector 1 of this embodiment will be described with reference to the flowchart of FIG. 5.

Figure 5:
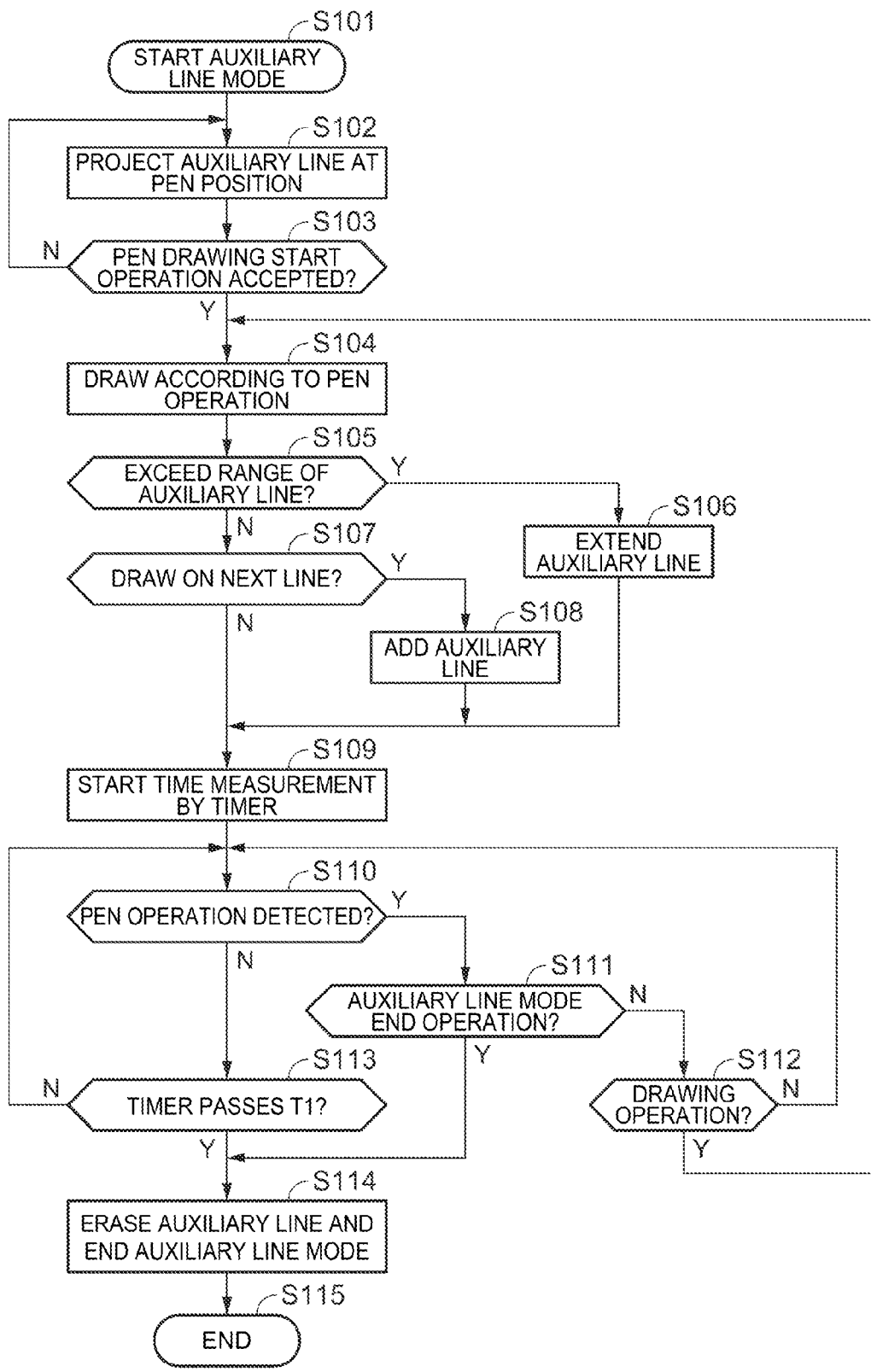
FIG. 5 is a flowchart showing the operator of the projector.

FIG. 5 is a flowchart showing the operation in the auxiliary line mode of the projector 1.

As shown in FIG. 5, during the operation, if the projector 1 accepts a start operation for the auxiliary line mode by the electronic pen 40 (Step S101), the mode setting unit 201 sets the projector to the auxiliary line mode and the processing shifts to Step S102. The start operation for the auxiliary line mode is carried out by pressing the auxiliary line mode button B1 on the tool menu M1 with the electronic pen 40, as shown in FIG. 4A.

In Step S102, the control unit 20 projects an auxiliary line at the position of the electronic pen 40 detected by the pen operation detection unit 25 and the processing shifts to Step S103. Again, the auxiliary line moves with the movement of the electronic pen 40, as shown in FIG. 4B. Here, Step S102 is equivalent to an auxiliary line displaying step.

In Step S103, the control unit 20 checks whether a drawing start operation is accepted or not. Specifically, whether the pen point switch 40B of the electronic pen 40 is operated or not is determined. If a drawing start operation is accepted (Step S103: Y), the processing shifts to Step S104. If a drawing start operation is not accepted (Step S103: N), the processing shifts to Step S102.

In Step S104, the control unit 20 generates drawing data according to the operation information of the electronic pen 40 detected by the pen operation detection unit 25 and draws an image on the projection surface SC. The processing then shifts to Step S105. Step S104 is equivalent to a position detection step and a drawing step.

In Step S105, the control unit 20 checks whether the drawing data by the electronic pen 40 exceeds the range of the auxiliary line or not. Specifically, if the auxiliary line is drawn in a horizontal direction, whether the drawing exceeds the right end position of the auxiliary line or not is checked.

If the drawing (drawing data) exceeds the range of the auxiliary line (Step S105: Y), the processing shifts to Step S106. In Step S106, the control unit 20 extends the currently projected auxiliary line according to the drawing data. The operation at this time is shown in FIGS. 4C and 4D. The processing then shifts to Step S109. Meanwhile, if the drawing data does not exceed the range of the auxiliary line (Step S105: N), the processing shifts to Step S107. Step S106 is equivalent to an auxiliary line displaying step.

In Step S107, the control unit 20 checks whether the drawing with the electronic pen 40 is carried out on the next line or not. Specifically, if the drawing is in a horizontal direction, as shown in FIG. 4D, whether the drawing is carried out in a different direction from the direction (horizontal or vertical) of the auxiliary line or not is checked.

If the drawing is carried out on the next line (Step S107: Y), the processing shifts to Step S108. In Step S108, the control unit 20 additionally projects an auxiliary line at the position of the new drawing data and parallel to the currently projected auxiliary line. The processing then shifts to Step S109. The operation at this time is shown in FIG. 4E. Meanwhile, if the drawing is not carried out on the next line (Step S107: N), the processing shifts to Step S109. Step S108 is equivalent to an auxiliary line displaying step. Also, Steps S102 to S109 are equivalent to a control step.

In Step S109, the control unit 20 starts time measurement by a timer, not shown. The processing then shifts to Step S110.

In Step S110, the control unit 20 checks whether a pen operation with the electronic pen 40 is detected or not. If a pen operation is detected (Step S110: Y), the processing shifts to Step S111. If a pen operation is not detected (Step S110: N), the processing shifts to Step S113.

In Step S111, the control unit 20 checks whether the pen operation accepted in Step S110 is an operation to end the auxiliary line mode or not. If an auxiliary line mode end operation is accepted (Step S111: Y), the processing shifts to Step S114. If the accepted pen operation is not an auxiliary line mode end operation (Step S111: N), the processing shifts to Step S112.

In Step S112, the control unit 20 checks whether the pen operation accepted in Step S110 is a drawing operation or not. If a drawing operation is accepted (Step S112: Y), the processing shifts to Step S104. If the accepted pen operation is not a drawing operation (Step S112: N), the processing shifts to Step S110.

In Step S113, the control unit 20 checks whether the time measured by the timer exceeds a predetermined time T1 (for example, five seconds) or not. If the time measured by the timer exceeds the time T1 (Step S113: Y), the processing shifts to Step S114. If the time measured by the timer does not exceed the time T1 (Step S113: N), the processing shifts to Step S110.

In Step S114, the mode setting unit 201 erases the auxiliary lines from the projection surface SC and ends the auxiliary line mode. The processing then shifts to Step S115.

In Step S115, this operation flow ends and returns to the original processing.

The embodiment has the following effects.

According to the projector 1 of the embodiment, in the auxiliary line mode, the auxiliary lines L1, L2 are projected on the projected image at the time of drawing with the electronic pen 40, and the auxiliary lines L1, L2 are erased at the end of the drawing. This makes it easier to draw characters and symbols or the like with reference to the auxiliary lines L1, L2. Also, the auxiliary lines L1, L2 are erased at the end of the drawing. Therefore, the auxiliary lines L1, L2 can be prevented from obstructing the drawing data D1 and the image data G1.

Also, the auxiliary line mode, in which the auxiliary lines L1, L2 are displayed at the time of drawing, is started by an operation of the electronic pen 40. Therefore, the auxiliary lines L1, L2 can be displayed at a desired time while the image data G1 is projected, thus enabling efficient drawing.

Moreover, when the drawing in the auxiliary line mode is started, the auxiliary lines L1, L2 with a predetermined length are displayed at the position of the electronic pen 40 and the auxiliary lines L1, L2 move with the movement of the electronic pen 40. Therefore, the position to display the auxiliary lines L1, L2 can be designated freely.

Also, the auxiliary line mode is ended when an indication to a predetermined area in the image data G1 (in the embodiment, an operation on the auxiliary line mode button B1) is given by the electronic pen 40 or when drawing is not carried out for a predetermined period, at the time of drawing in the auxiliary line mode. Thus, when an auxiliary line is no longer necessary during drawing in which the auxiliary line is displayed, the auxiliary line is immediately erased in response to an indication by the electronic pen 40. When drawing is not carried out for a while, the auxiliary line is automatically erased. The auxiliary line mode can be thus ended.

Also, during the drawing in the auxiliary line mode, the auxiliary lines L1, L2 are extended or the auxiliary line L3 is added, according to the drawing data D1. Therefore, in the case where the drawing range of characters and symbols expands or where drawing is started on a different line, an auxiliary line can be extended or added without any particular operation.

The embodiment can also be changed as follows.

Modification 1

In the embodiment, when the auxiliary line mode is started, the shape of the auxiliary line and the number of auxiliary lines that are initially displayed, or the like, may be changeable.

Modification 2

In the embodiment, the indicator is the electronic pen 40 emitting infrared rays. However, the indicator is not limited to such an electronic pen. For example, an indicator which emits visible rays, or wireless communication waves or the like may be employed. The indicator may also be the user's finger.

Modification 3

In the embodiment, the projector 1 having the interactive function is described as an example. However, the technique is not limited to the projector and can be applied to any image display device having a touch panel or the like which detects an input operation to a displayed image. For example, the technique can be applied to a rear projector, liquid crystal display, plasma display, organic EL (electroluminescence) display or the like having an integrated transmission-type screen.

What is claimed is:

1. An image display device having a display unit for displaying an image, the device comprising:
    a position detection unit that detects position information representing a position indicated by an indicator within image data corresponding to an image displayed by the display unit;
    a drawing unit that generates drawing data according to the position information when a drawing operation indicated by the indicator is carried out, the drawing unit projecting the drawing data;
    an auxiliary line display unit that displays an auxiliary line within the image;
    a mode setting unit that sets an auxiliary line mode in which the auxiliary line is displayed at a time of the drawing operation and in which the auxiliary line is erased at an end of the drawing operation; and
    a control unit that causes the auxiliary line display unit to display the auxiliary line at the time of the drawing operation in the auxiliary line mode.

2. The image display device according to claim 1, wherein the mode setting unit starts the auxiliary line mode when the position detection unit detects an indication by the indicator to a predetermined area within the image data.

3. The image display device according to claim 2, wherein the control unit causes the auxiliary line with a predetermined length to be displayed at the position of the indicator before the drawing operation by the indicator is started and moves the auxiliary line with a movement of the indicator, after the auxiliary line mode is started.

4. The image display device according to claim 1, wherein the mode setting unit ends the auxiliary line mode when the position detection unit detects an indication by the indicator to a predetermined area within the image data or when the drawing operation by the indicator is not carried out for a predetermined period, after the drawing operation is started.

5. The image display device according to claim 1, wherein the control unit adds the auxiliary line in a parallel direction or extends the length of the auxiliary line according to the position of the drawing data that is drawn, after the drawing operation is started.

6. The image display device according to claim 1, wherein the image display device displays the image including a first button and a second button,
    when the first button is pressed, the mode setting unit sets a first auxiliary line mode and the control unit causes the auxiliary line display unit to display the auxiliary line in a first direction at the time of the drawing operation in the first auxiliary line mode, and
    when the second button is pressed, the mode setting unit sets a second auxiliary line mode and the control unit causes the auxiliary line display unit to display the auxiliary line in a second direction different from the first direction at the time of the drawing operation in the second auxiliary line mode.

7. A projector having a light source and an image projection unit which modulates a light emitted from the light source according to image data and projects the modulated light, the projector comprising:
    a position detection unit that detects position information representing a position indicated by an indicator within a projected image projected by the image projection unit;
    a drawing unit that generates drawing data in the projected image according to the position information when a drawing operation indicated by the indicator is carried out, the drawing unit projecting the drawing data;
    an auxiliary line display unit that displays an auxiliary line within the image;
    a mode setting unit that sets an auxiliary line mode in which the auxiliary line is displayed at a time of the drawing operation and in which the auxiliary line is erased at an end of the drawing operation; and
    a control unit that causes the auxiliary line display unit to display the auxiliary line at the time of the drawing operation in the auxiliary line mode.

8. The projector according to claim 7, wherein the projected image includes a first button and a second button,
    when the first button is pressed, the mode setting unit sets a first auxiliary line mode and the control unit causes the auxiliary line display unit to display the auxiliary line in a first direction at the time of the drawing operation in the first auxiliary line mode, and
    when the second button is pressed, the mode setting unit sets a second auxiliary line mode and the control unit causes the auxiliary line display unit to display the auxiliary line in a second direction different from the first direction at the time of the drawing operation in the second auxiliary line mode.

9. A control method for an image display device having a display unit for displaying an image, the method comprising:
    detecting position information representing a position indicated by an indicator within image data corresponding to an image displayed by the display unit;
    generating drawing data within the image data according to the position information when a drawing operation indicated by the indicator is carried out and projecting the drawing data;
    displaying an auxiliary line within the image;
    setting an auxiliary line mode in which the auxiliary line is displayed at a time of the drawing operation and in which the auxiliary line is erased at an end of the drawing operation; and causing the auxiliary line to be displayed, by the displaying of the auxiliary line, at the time of the drawing operation in the auxiliary line mode.

\* \* \* \* \*